United States Patent [19]

Haman

[11] Patent Number: 5,663,230
[45] Date of Patent: Sep. 2, 1997

[54] WATER STOP COMPOSITION AND METHODS OF PREPARING SAME

[75] Inventor: Robert J. Haman, New Carlisle, Ohio

[73] Assignee: Concrete Sealants, Inc., New Carlisle, Ohio

[21] Appl. No.: 388,714

[22] Filed: Feb. 15, 1995

[51] Int. Cl.$^6$ .............................. C08J 5/10; C08K 3/34; C08L 53/02
[52] U.S. Cl. .............................. 524/447; 524/445; 525/98
[58] Field of Search .............................. 525/98; 524/445, 524/442, 447, 448, 451

[56] References Cited

U.S. PATENT DOCUMENTS

| | | | |
|---|---|---|---|
| 4,209,568 | 6/1980 | Clem | 428/454 |
| 4,344,722 | 8/1982 | Blais | 405/270 |
| 4,501,788 | 2/1985 | Clem . | |
| 4,534,925 | 8/1985 | Harriett | 264/281 |
| 4,534,926 | 8/1985 | Harriett | 264/281 |
| 4,613,542 | 9/1986 | Alexander | 428/290 |
| 4,624,982 | 11/1986 | Alexander | 524/446 |
| 4,668,724 | 5/1987 | Harriett | 524/108 |
| 4,693,923 | 9/1987 | McGroarty et al. | 428/148 |
| 4,787,780 | 11/1988 | Harriett | 405/270 |

OTHER PUBLICATIONS

Chemical Abstracts, vol. 99,1983, p. 28–99:195819y Effect Of Bentonite Or Rheological And Mechanical Properties Of Polypropylene.
Brochure "An Introduction To Vistanex LM Low Molecular Weight Polyisobutylene", Exxon Chamical Company USA.
Hardman Inc. Material Safety Data Sheet for Kalar 5263, pp. 1–4, Jan. 29, 1991.
Pfizer Inc. Material Safety. Data Sheet for Microtalc—Montana Talc, Rev. 2, pp. 1–5, Jun., 1988.
United Clays Inc. Material Safety Data Sheet for product 101, pp. 1–4, May, 1991.
Product Fact Sheet Vistanex MM Polyisoburylene, Jul. 1, 1991 Exxon Chemical Polymers Group.
Union Camp Chemcentral/Cincinnati for Unitol AFL pp. 1–5, Aug. 5, 1991.
Product Fact Sheet Vistanex LM Polyisobutylene—Vistanex LM—Regular Grades, Dec., 1992.
Exxon Chemical Company Polymers Group Material Safety Data Sheet for Vistanex LM, pp. 1–4, Jul. 21, 1993.
Brochure Vistanex Polyisobutylene Properties And Applications, Exxon Chemical Company, Copyright 1993.
Material Safety Data Sheet—Central Fiber Corporation for Cellulosic Based Fibers, pp. 1–3, Jan. 1994.
Shell Environmental Data Sheet for Shellvis(R) 40 Viscosity Index Improver, pp. 1–5, Apr. 8, 1988.
Southern Clay Products, Inc. Material Safety Data Sheet for Bentolite L–10, Apr. 25, 1994.
Southern Clay Products, Inc. Material Safety Date Sheet for Astra Ben 5, Apr. 27, 1994.
Miles Material Safety Data Sheet for Polysar BUTYL XL 10000, pp. 1–6, Apr. 1, 1994.
WITCO Material Safety Data Sheet for Kendex 0842, pp. 1–3.
Product Fact Sheet Kendex Industrial Products, Kendall/Amalie, Div. of Witco Corp. for Kendex 0842.

*Primary Examiner*—Paul R. Michl
*Assistant Examiner*—U. K. Rajguru
*Attorney, Agent, or Firm*—Biebel & French

[57] ABSTRACT

Water stop compositions and methods of preparing same are disclosed. The compositions exhibit a controlled swelling or volumetric expansion upon immersion in water. The compositions swell about 5–8% after 1 day's immersion and about 35–65% after 28 day's immersion. A blend of fast acting sodium bentonite clay and a slower acting calcium bentonite clay contribute to this desirable controlled expansion along with a specific combination of thermoplastic elastomer, cross-linked butyl rubber components and polyisobutylene. Another important factor in providing the desired expansion is a thorough mixing step to ensure product homogeneity whereby mix components are blended in a Sigma mixer for an excess period of time after all components have been added to the mixer.

An exemplary water stop composition includes about 10–30 wt % elastomer, about 15–30 wt % filler, about 20–40 wt % plasticizer, and about 25–35 wt % water swellable clay, the foregoing percentages adding up to 100 wt %. The water swellable clay preferably includes 40–50 wt % sodium bentonite clay, with the remainder consisting of calcium bentonite clay.

7 Claims, No Drawings

WATER STOP COMPOSITION AND METHODS OF PREPARING SAME

FIELD OF THE INVENTION

The present invention pertains to water stop compositions and methods of preparing same.

BACKGROUND

Water stop compositions are normally extruded in the form of elongated ropes or tapes and are typically used as a gasket or seal in the joints or gaps between adjacent concrete or metallic building panels or structure. A variety of rubber, plastic, and asphalt water stop compositions have been used throughout the years.

Desirably, the water stop should be swellable so that upon hydrolysis it will expand to cover the surface area of the joint or gap in which it is placed. In this manner, the water stop can then adequately perform its intended function of acting as a water seal to prevent water penetration into the gap or joint.

To this end, a variety of compositions including water soluble clays, such as the bentonites, and a plurality of elastomeric materials has been proposed. For example, U.S. Pat. No. 4,668,724 discloses water stop compositions comprising non-hydrated bentonite clay contacted with a polypropene and/or polybutene tackifier. Purportedly, the polypropene an/or polybutene tackifiers increase the swelling capacity of the bentonite while providing sufficient tack or adherence characteristics to the water stop.

European Patent Application 0 037 717 discloses an aqueously swelling water stopping composition which comprises polyisobutylene elastomer, silicates and bentonite. The silicate components are apparently included to increase the swelling effects of the compositions, with volumetric swelling increases on the order of 80% and greater for 1 day tests being reported.

Other clay based water swellable compositions are taught for example in U.S. Pat. Nos. 4,624,982 (Alexander); 4,534,925 (Harriet); 4,534,926 (Harriet); 4,787,780 (Harriet); 4,693,923 (McGroaty); 4,344,722 (Blais); 4,209,568 (Clem); 4,613,542 (Alexander); and 4,501,788 (Clem).

Despite the efforts of the prior art, and in contrast to the desirability for high volumetric expansion as taught in the above European application, it has been found highly desirable to provide a "controlled expansion" water stop material. More specifically, it has been found that virtually uncontrolled or high expansion water stop compositions deteriorate and fail under actual usage conditions. At the same time however, the compositions should be capable of swelling to a limited degree so that they may adequately fill the structural gaps or joints into which they are placed to provide the desired water sealing function.

SUMMARY OF THE INVENTION

These and other objects of the invention are met by the compositions and methods of preparing same as herein disclosed. The compositions exhibit desirable "controlled expansion" in that they will expand rapidly in an amount of at least 5% over a 24-hour period, but they will not expand greater than about 65% over a 28-day test period. This latter expansion limitation is important in that it signifies that a water stop made from such compositions will predictably withstand prolonged moisture contact without significant deterioration.

Accordingly, the proper blend of initial and delayed expansion has been found so as to provide adequate, desired initial water stop expansion so that the composition can expand to occupy a structural joint or gap to provide adequate water sealing protection. At the same time due to its limited long term expansion, a durable water stop product is provided.

More specifically, it has been found that a blend of bentonite clays, each present in a surprisingly small amount, promotes the desired swelling balance. This blend of bentonites coupled with an elastomeric blend of thermoplastic elastomer, cross-linked butyl rubber and polyisobutylene contributes tack, elasticity and tenacity to the composition.

Moreover, the desired controlled expansion property is also thought dependent to at least a limited degree upon the particular method by which it is prepared. Here, after all of the water stop composition components have been blended together in a suitable mixing vessel such as a Sigma blender or Banbury, an additional mixing or blending for a period of about 55–85 minutes is provided to assure composition homogeneity.

The invention will be further described in the following detailed description:

DETAILED DESCRIPTION

Compositions in accordance with the invention include about 10–30 wt % elastomeric component, about 5–10 wt % tackifying agent, fillers in an amount of 15–30 wt %, plasticizers in an amount of about 20–40 wt %, and about 25–35 wt % water swellable clay. The foregoing percentages add up to 100%.

The elastomeric component is carefully selected to combine the enhanced processability of a thermoplastic elastomer, the elongation and tenacity attributes of cross-linked butyl rubbers and the tackiness, softness and flexibility properties of polyisobutylene. Preferably the cross-linked butyl rubber component or components comprise about 10–20 wt % of the total elastomeric component present, preferably about 15 wt %.

The thermoplastic elastomers (TPE) are well-known in the art. For example, they can comprise styrene/butadiene type copolymers or styrene-ethylene/propylene type block copolymers. Additionally, the TPE may include EPDM or EPM rubbers copolmerized with polyolefinic resins such as polyethylene, polypropylene, poly 1-butene, poly 1-pentene, etc. Suitable thermoplastic elastomers are sold by Shell under the Shellvis or Kraton trademarks. Also Alcryn brand TPES available from DuPont may be mentioned as exemplary.

The butyl rubbers are typically at least partially cross-linked and may for example comprise isobutylene, isoprene and divinylbenzene terpolymers. Additionally, one preferred butyl rubber comprises partially cross-linked butyl rubber present in a heavy paraffinic distillate base to improve processing and serve as a partial plasticizer. This latter butyl rubber is sold by Hardman Inc. under the "Kalar" trademark.

As to the butyl rubber terpolymers noted above, "Polysar Butyl XL 10000" may be mentioned as being exemplary. This product is available from Mobay.

Elastomeric blends in accordance with the invention include

| | |
|---|---|
| TPE | 50–60 wt% of total elastomer present |
| Cross-linked Butyl Rubber | 10–20 wt % of total elastomer present |

-continued

| | |
|---|---|
| Polyisobutylene | 20–40 wt % of total elastomer present |
| | all of these percentages add up to 100% |

Preferably, the TPE blend comprises

| | |
|---|---|
| TPE | 55 wt % |
| Cross-linked Butyl Rubber | 15 wt % |
| Polyisobutylene | 30 wt % |

The butyl rubber component itself preferably includes a blend of (1) isobutylene/isoprene/divinylbenzene terpolymer; and
(2) partially cross-linked butyl rubber in a heavy paraffinic distillate These two specific butyl rubber components are preferably present in about a 1:1 wt. ratio. The partially cross-linked butyl rubber in heavy paraffinic distillate component (2) is softer than the other (1) butyl rubber component. This blend of (1) and (2) butyl rubbers provides desirable cold flow stability to the product while allowing acceptable elasticity and elongation. The polyisobutylenes are by themselves, well-known in the art. Preferred are the low molecular weight polyisobutylene homopolymer tackifiers having molecular weights of about 10,700–11,900 (Staudinger). These are available from Exxon under the Vistanex LM trademarks.

A variety of fillers may be provided in accordance with the invention. Non-swelling clays, talc, carbon black, and cellulosic fibers may be mentioned. In this regard, the inclusion of short cellulosic fibers in an amount of about 3–5wt % of the total composition weight imparts mechanical strength.

Ball clay in an amount of about 14–20 wt % is also a desirable filler as, in addition to filler function, it imparts plasticity and helps in mixing and processing of the composition. Carbon black and talc are to be added to the mixture, as desired.

Plasticizers, such as process oils are used in an amount of about 20–40 wt %, based on the weight of the water stop composition to provide the necessary matrix or continuous phase for processability. Exemplary process oils include petroleum aromatic-napthenic oils, napthenic-aromatic oils; napthenic-paraffinic oils and paraffinic oil. The preferred process oil is available from Witco under the designation Kendex 0842.

Additionally, other plasticizers such as mineral oil softeners, vegetable oil softeners, fatty acids, fat and oil, esters and phosphates may be added.

The water swellable clay utilized is actually a mixture of "fast-acting" and "slow-acting" bentonite clays. The "fast-acting" component is a sodium exchanged Texas calcium bentonite clay. These clays have a $Na_2O$ content (analysis upon ignition) of greater than about 1.0% and are herein referred to as a sodium bentonite clay.

The preferred high swelling sodium bentonite clay used in accordance with the invention is sold by Southern Clay Products under the "Astra-Ben 5" designation. This is described as a hydrated aluminum silicate, bentonite clay, having the following oxide analysis:

| | |
|---|---|
| $SiO_2$ | 56.8 |
| $Al_2O_3$ | 18.0 |
| $Fe_2O_3$ | 4.2 |
| $TiO_2$ | 0.3 |
| CaO | 1.5 |
| MgO | 3.0 |
| $Na_2O$ | 1.7 |
| $K_2O$ | 0.4 |
| LOI | 13.7 |

As to the lower swelling clay, this is preferably a non-sodium exchanged calcium bentonite wherein, as can be seen, the $Na_2O$ content is less than in the sodium bentonites. These are referred to herein as calcium bentonite clays. The preferred calcium bentonite is available under the "Bentolite L-10" designation by United Clay. Its typical oxide analysis is:

| | |
|---|---|
| $SiO_2$ | 70 |
| $Al_2O_3$ | 17 |
| $Fe_2O_3$ | 1 |
| CaO | 2 |
| MgO | 3 |
| $Na_2O$ | 0.5 |
| $K_2O$ | 0.3 |
| LOI (980°) | 5 |

The faster reacting sodium bentonite is present in an amount of about 40 wt %–50 wt % of the total bentonite mix used for the water stop composition. Preferably, the sodium bentonite is present in an amount of about 43–45 wt % based on the total bentonite present.

In accordance with the invention, exemplary and preferred water stop compositions are as listed:

| Exemplary | |
|---|---|
| Elastomeric Component | 10–30 wt % |
| Filler | 15–30 wt % |
| Plasticizers | 20–40 wt % |
| Water Swellable Clay | 25–35 wt % |
| | all of these components add up to 100 wt % |

| Preferred | |
|---|---|
| Elastomer Component | |
| TPE | |
| Cross-linked Butyl Rubber | } 18–24 wt % |
| Polyisobutylene | |
| Filler | 19–27 wt % |
| Plasticizers | 26–30 wt % |
| Water Swellable Clay | 26–32 wt % |
| | all of these components add up to 100 wt % |

| Most Preferred | |
|---|---|
| Elastomer | |
| TPE | 10–12 |
| Cross-linked Butyl Rubber | 2–4 |
| Polyisobutylene | 6–8 |
| Filler | |
| Non-swelling clay ball clay | 14–19 |
| Talc | 1–2 |
| Carbon Black | 1–2 |
| Cellulose Fiber | 3–4 |

-continued

| Plasticizer | |
|---|---|
| Process Oil | 26–28 |
| Tall oil Fatty Acid | 5–2 |
| Water Swellable Clay | |
| Sodium Bentonite | 13–16.5 |
| Calcium Bentonite | 13–16.5 |
| | all of these components add up to 100 wt % |

It is also apparent that the particular blending or mixing procedure utilized is important in achieving the goals of the present invention. In this respect, the ingredients can all be blended and mixed together in an appropriately sized Sigma blender or the like. First, the thermoplastic elastomer, and butyl rubber components are added to the Sigma blender along with the carbon black, polyisobutylene and tall oil fatty acid plasticizer in the presence of significant amounts of the process oil plasticizer. This mixture is then mixed or blended until smooth with additional process oil, fiber, fast swelling sodium bentonite clay and ball clay filler being added. The mixture is mixed for about 10 minutes with an additional amount of process oil, calcium bentonite and additional ball clay being added. Talc is then added after the mixing is completed.

In accordance with the invention, once all of the components have been introduced into the mixture and thoroughly mixed, an additional mixing step of from about 40–85 minutes, preferably 50–85, is utilized to ensure complete homogeneity of all of the ingredients. Surprisingly, this extra mixing step has proven quite important in achieving the "controlled expansion" attributes of the present invention. The mixing reaction is exothermic. Temperature is monitored and should be regulated to between about 240°–295° F.

After this second mixing step has occurred, the water stop composition is then allowed to sit for a period of about 12–48 hours, preferably 24 hours, to stabilize. The thus stabilized mix is then fed to an extruder wherein, as is conventional in the art, the composition is extruded in the form of an elongated rope or tape. Conventionally, a paper backing substrate is coextruded with the water stop composition along one longitudinally extending side of the tape or rope. The paper is peeled away prior to usage at the job site.

The extruded water stop composition is then ready for use to fill a gap or joint existing between structural units such as concrete and/or metal building panels. In accordance with the invention, the water stop desirably expands by an amount of at least 5%, preferably 5–8%, after 24 hour's immersion in water. In contrast to many of the prior art extruded water stop tapes or ropes, after a period of 28 days immersion in water, an expansion of about 35–65%, preferably 35–50% is experienced. This latter delayed expansion characteristic is important in that, in actual use, it means that a durable, integral product is formed that will not be significantly prone to cracking and separation into discrete particles.

The invention will be explained in conjunction with the appended examples, which are included as being illustrative of the invention and should not be construed as limitations.

Example 1—Composition Preparation

Compositions having the following formulations were made in accordance with the mixing procedures stated above.

| Component | Composition Number | | | | | | Component Identification Supplier |
|---|---|---|---|---|---|---|---|
| | 1 | 2 | 3 | 4 | 5 | 6 | |
| Thermoplastic Elastomer | 11.14 | 11.08 | 11.00 | 10.98 | 11.08 | 11.23 | A |
| X-linked Butyl Rubber | 1.64 | 1.63 | 1.62 | 1.61 | 1.63 | 1.65 | B |
| X-linked Butyl Rubber in an oil base | 1.64 | 1.63 | 1.62 | 1.61 | 1.63 | 1.65 | C |
| Polyisobutylene | 6.19 | 6.15 | 6.12 | 6.10 | 6.15 | 6.24 | D |
| Ball Clay | 18.56 | 17.42 | 14.25 | 16.22 | 17.42 | 17.10 | E |
| Micro Talc | 1.55 | 1.54 | 1.53 | 1.52 | 1.54 | 1.56 | F |
| Carbon Black | .40 | .40 | .40 | .40 | .40 | .41 | G |
| Cellulosic Fibers | 3.28 | 3.26 | 3.24 | 3.23 | 3.26 | 3.31 | H |
| Fatty Acid Plasticizer | .46 | .46 | .46 | .46 | .46 | .47 | I |
| Process Oil Plasticizer | 26.30 | 26.77 | 27.22 | 27.44 | 26.77 | 25.74 | J |
| Sodium Bentonite Clay | 12.38 | 13.29 | 16.27 | 14.21 | 13.29 | 14.04 | K |
| Calcium Bentonite Clay | 16.46 | 16.37 | 16.27 | 16.22 | 16.37 | 16.60 | L |
| Batch Size (lbs) | 1616 | 1625 | 1636 | 1640 | 3250 | 3205 | |
| Mix Time After All Components Added | 29 | 24 | 51 | 43 | 70 | 71 | |
| Total Mix Time | 117 | 86 | 121 | 102 | 159 | 141 | |
| Temperature °F. | 278 | 272 | 290 | 287 | 268 | 276 | |

A = Styrene-ethylene/propylene block copolymer Shellvis 40/50; Shell
B = Cross-linked butyl terpolymer rubber; isobutylene, isoprene, divinylbenzene terpolymer; Polysar Butyl XL 10000, available Mobay
C = Cross-linked butyl rubber in heavy paraffinic distillate base; Kalar 5263, Hardman Inc., Belleville, NJ
D = Vistanex LM, Exxon Chemical; polyisobutylene MW, Staudinger 10,700–11,900
E = Ball Clay, available United Clays Inc., Gleason, Tennessee
F = Micro Talc - magnesium silicate hydrate; Montana Talc
G = Carbon Black - Huber Corporation
H = Cellulose Fibers; Central Fiber Corp., Wellsville, Kansas
I = Tall Oil Fatty Acid Mixture of mostly Oleic & Linoleic Acid, Union Camp.
J = Process Oil; Kendex 0842; Witco Chemical
K = Sodium bentonite clay - Astroben-4 - Southern Clay Products, Gonzales, Texas
L = Calcium bentonite clay - Bentonite L-10; Southern Clay Products, Gonzales, Texas Example 2—Volumetric Expansion Extruded tapes were made from the water stop compositions identified in Example 1. The extruded tapes were immersed in water for the requisite time periods, and tape volume increases were recorded. The following results were obtained.

Results are given in terms of average values obtained from four roll samples of each of the compositions.

|  |  | Days | | | | | | | |
|---|---|---|---|---|---|---|---|---|---|
| Composition | S.P. Grav. | 1 | 4 | 7 | 14 | 21 | 28 | 35 | 50 |
| | | Extruded Shape ¾" × 1" | | | | | | | |
| | | (3 days) | | | | | | | |
| 5 | 1.3125 | 7.49 | 12.02 | 20.83 | 32.06 | 36.87 | 43.13 | 48.86 | |
| 6 | 1.3475 | 5.79 | 9.90 | 17.16 | 24.54 | 30.56 | 36.21 | 41.38 | |
| | | Extruded Shape .60" × ¾" | | | | | | | |
| 5 | 1.31 | 8.04 | 14.81 | 26.32 | 40.63 | 49.88 | 59.39 | 66.31 | |
| 6 | 1.34 | 6.80 | 12.20 | 22.11 | 33.01 | 41.67 | 48.58 | 57.39 | |
| | | Extruded Shape ⅞" × 1⅜" | | | | | | | |
| 5 | 1.30 | 5.56 | 10.37 | 16.01 | 24.03 | 30.64 | 36.24 | 41.34 | |
| 6 | 1.35 | 5.45 | 8.41 | 13.37 | 20.11 | 25.15 | 31.13 | 36.95 | |

*indicates signs of cracking

Example 3—Volumetric Expansion

Another series of compositions were prepared in accordance with the procedures detailed above. Extruded tapes made from these compositions were tested for volumetric expansion upon immersion in water for the requisite time test periods as per Example 2. The following results were obtained. Again, results are given as average values derived from four roll samples of each of the compositions.

|  |  | Days | | | | | | | |
|---|---|---|---|---|---|---|---|---|---|
| Composition | S.P. Grav. | 1 | 4 | 7 | 14 | 21 | 28 | 35 | 50 |
| 1 | 1.265 | 2.36 | 7.02 | 9.89 | 12.82 | 17.89 | 23.59 | 25.14 | 26.46 |
| 2 | 1.292 | 2.57 | 7.20 | 10.68 | 15.58 | 21.48 | 26.26 | 27.32 | 32.47 |
| 3 | 1.298 | 4.81 | 13.27 | 19.78 | 31.22 | 42.88 | 42.78* | — | — |
| 4 | 1.29 | 4.90 | 14.3 | 24.28 | 40.28 | 52.66 | 63.25* | — | — |

*Signs of Cracking

DISCUSSION OF EXAMPLES

Based upon the above tests, compositions in accordance with the above will exhibit the desired controlled volume expansion of about 5–8% after 24 hours and between about 35–65% expansion after 28 days provided that process mixing-time after addition of the last formulation component is regulated to between about 50–85 minutes. Additionally, although Applicant is not to be bound to any particular theory of operation, the specific combination of high swelling sodium bentonite clay and lower swelling calcium bentonite clay in the formulation appears to provide a surprising balance between desirable initial high volume increase and controlled 28 day expansion. Based upon the data presently available, composition No. 6 is presently preferred.

The skilled artisan will appreciate that modifications may be made to the specific composition and process embodiments specifically described above without departing from the true spirit and scope of the invention as defined in the appended claims.

What is claimed is:

1. Moisture swellable water stop composition comprising about 10–30 wt % elastomer, about 15–30 wt % filler, about 20–40 wt % process oil plasticizer, and about 25–35 wt % water swellable bentonite clay, said bentonite clay comprising a mixture of a high swelling capacity sodium bentonite clay and a lower swelling capacity calcium bentonite clay.

2. Water stop composition as recited in claim 1 wherein said high swelling capacity sodium bentonite clay is present in an amount of about 40–50% by weight based upon the weight of said mixture of bentonite clay said water stop composition exhibiting a volumetric expansion of not more than about 65% after 28 days immersion in water.

3. Water stop composition as recited in claim 1 wherein said elastomer comprises a thermoplastic elastomer.

4. Water stop composition as recited in claim 3 wherein said thermoplastic elastomer comprises a styrene-ethylene/propylene block copolymer.

5. Water stop composition as recited in claim 1 wherein said elastomer comprises a thermoplastic elastomer, a cross-linked butyl rubber component, and a polyisobutylene polymer.

6. Water stop composition as recited in claim 5 wherein said cross-linked butyl rubber is present in an amount of about 10–20 wt % of the total elastomer present.

7. Water stop composition as recited in claim 1 exhibiting a volumetric expansion of about 5–8% after 24 hours immersion in water and between about 35–65% expansion after about 28 days immersion in water, said composition after 28 days immersion in water, exhibiting substantially no cracking and being substantially integral and intact.

* * * * *